US010220316B2

(12) United States Patent
Fukuda et al.

(10) Patent No.: US 10,220,316 B2
(45) Date of Patent: Mar. 5, 2019

(54) INFORMATION PROCESSING DEVICE, INFORMATION PROCESSING METHOD, PROGRAM, INFORMATION STORING MEDIUM, INFORMATION PROCESSING SYSTEM, AND MANAGEMENT DEVICE

(71) Applicant: Sony Interactive Entertainment Inc., Tokyo (JP)

(72) Inventors: Shizuto Fukuda, Chiba (JP); Shinji Aizawa, Tokyo (JP); Hisao Wada, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 29 days.

(21) Appl. No.: 15/102,889

(22) PCT Filed: Sep. 9, 2014

(86) PCT No.: PCT/JP2014/073749
§ 371 (c)(1),
(2) Date: Jun. 9, 2016

(87) PCT Pub. No.: WO2015/093109
PCT Pub. Date: Jun. 25, 2015

(65) Prior Publication Data
US 2016/0354691 A1    Dec. 8, 2016

(30) Foreign Application Priority Data
Dec. 20, 2013   (JP) .................................. 2013-264545

(51) Int. Cl.
*A63F 13/12*     (2006.01)
*A63F 13/497*    (2014.01)
(Continued)

(52) U.S. Cl.
CPC ............ *A63F 13/497* (2014.09); *A63F 13/25* (2014.09); *A63F 13/30* (2014.09); *A63F 13/49* (2014.09); *A63F 13/5372* (2014.09); *A63F 13/86* (2014.09)

(58) Field of Classification Search
CPC ................................. G07F 17/32; A63F 13/12
See application file for complete search history.

(56) References Cited

U.S. PATENT DOCUMENTS

2008/0113812 A1   5/2008   Kwon
2009/0118008 A1   5/2009   Kobayashi
(Continued)

FOREIGN PATENT DOCUMENTS

WO    2009102991 A1    8/2009
WO    2013111249 A1    8/2013

OTHER PUBLICATIONS

International Preliminary Report on Patentability and Written Opinion for corresponding PCT Application No. PCT/JP2014/073749, 11 pages, dated Jun. 30, 2016.
(Continued)

*Primary Examiner* — Omkar Deodhar
(74) *Attorney, Agent, or Firm* — Matthew B. Dernier, Esq.

(57) ABSTRACT

Provided are an information processing device, an information processing method, a program, an information storage medium, an information processing system, and a management device for allowing a user to request capture of a desired play image. A request section transmits capture condition data representing a condition for capturing a play image that indicates details of a game in progress. A confirmation process execution section performs a confirmation process for capture of the play image appropriate to the condition represented by the capture condition data.

14 Claims, 15 Drawing Sheets

(51) Int. Cl.
*A63F 13/30* (2014.01)
*A63F 13/49* (2014.01)
*A63F 13/25* (2014.01)
*A63F 13/5372* (2014.01)
*A63F 13/86* (2014.01)

(56) References Cited

U.S. PATENT DOCUMENTS

2012/0100910 A1 4/2012 Eichorn
2012/0269394 A1* 10/2012 Kern ................ G06F 17/30259
  382/103
2014/0349753 A1 11/2014 Imai

OTHER PUBLICATIONS

International Search Report for corresponding PCT Application No. PCT/JP2014/073749, 4 pages, dated Dec. 16, 2014.

* cited by examiner

F I G . 3

| REQUEST ID | REQUESTING PLAYER ID | REWARD DATA | DIFFICULTY DATA | FULFILLMENT STATUS DATA | CAPTURE CONDITION DATA ||| |
|---|---|---|---|---|---|---|---|
| | | | | | TITLE DATA | EVENT DATA | CAPTURED IMAGE TYPE DATA |
| 0101 | PLAYER C | 30 PTS | B | UNFULFILLED | GAME A | WHEN THE NUMBER OF ITEMS WON REACHES 10 OR MORE IN MAP 3 | STILL IMAGE |
| 0102 | PLAYER A | 50 PTS | A | UNFULFILLED | GAME A | WHEN THE CLEARING TIME IS 3 MIN OR LESS IN MAP 2 | MOVIE |
| 0103 | PLAYER B | 10 PTS | C | FULFILLED | GAME A | WHEN THE SCORE REACHES 10000 OR MORE IN MAP 1 | MOVIE |
| 0104 | PLAYER B | 100 PTS | S | UNFULFILLED | GAME A | WHEN THE PLAYER X IS BEATEN IN MULTIPLAY | MOVIE |

FIG.4

| | REQUEST LIST [GAME A] | |
|---|---|---|
| | SORT: LATEST TO EARLIEST ▽ | |
| RWI — REWARD | DI DIFFICULTY REQUEST DETAILS | RS |
| PI(b) — 🔲 100 PTS | S MOVIE WHEN THE PLAYER X IS BEATEN IN MULTIPLAY | RI |
| PI(b) — 🔲 10 PTS | C MOVIE WHEN THE SCORE REACHES 10000 OR MORE IN MAP 1 | RI |
| PI(a) — 🙂 50 PTS | A MOVIE WHEN THE CLEARING TIME IS 3 MIN OR LESS IN MAP 2 | RI |
| PI(c) — ⊕ 30 PTS | B STILL IMAGE WHEN THE NUMBER OF ITEMS WON REACHES 10 OR MORE IN MAP 3 | RI |
| RWI | DI RS | |

FIG. 5

| ACCEPTANCE REQUEST ID | REQUESTING PLAYER ID | REWARD DATA | DIFFICULTY DATA | CAPTURE CONDITION DATA ||||
|---|---|---|---|---|---|---|---|
| | | | | TITLE DATA | EVENT DATA | CAPTURED IMAGE TYPE DATA | TIMING RELATIONSHIP DATA |
| 0104 | PLAYER B | 100 PTS | S | GAME A | WHEN THE PLAYER X IS BEATEN IN MULTIPLAY | MOVIE | 3 MIN BEFORE TO 3 MIN AFTER THE OCCURRENCE OF THE EVENT |

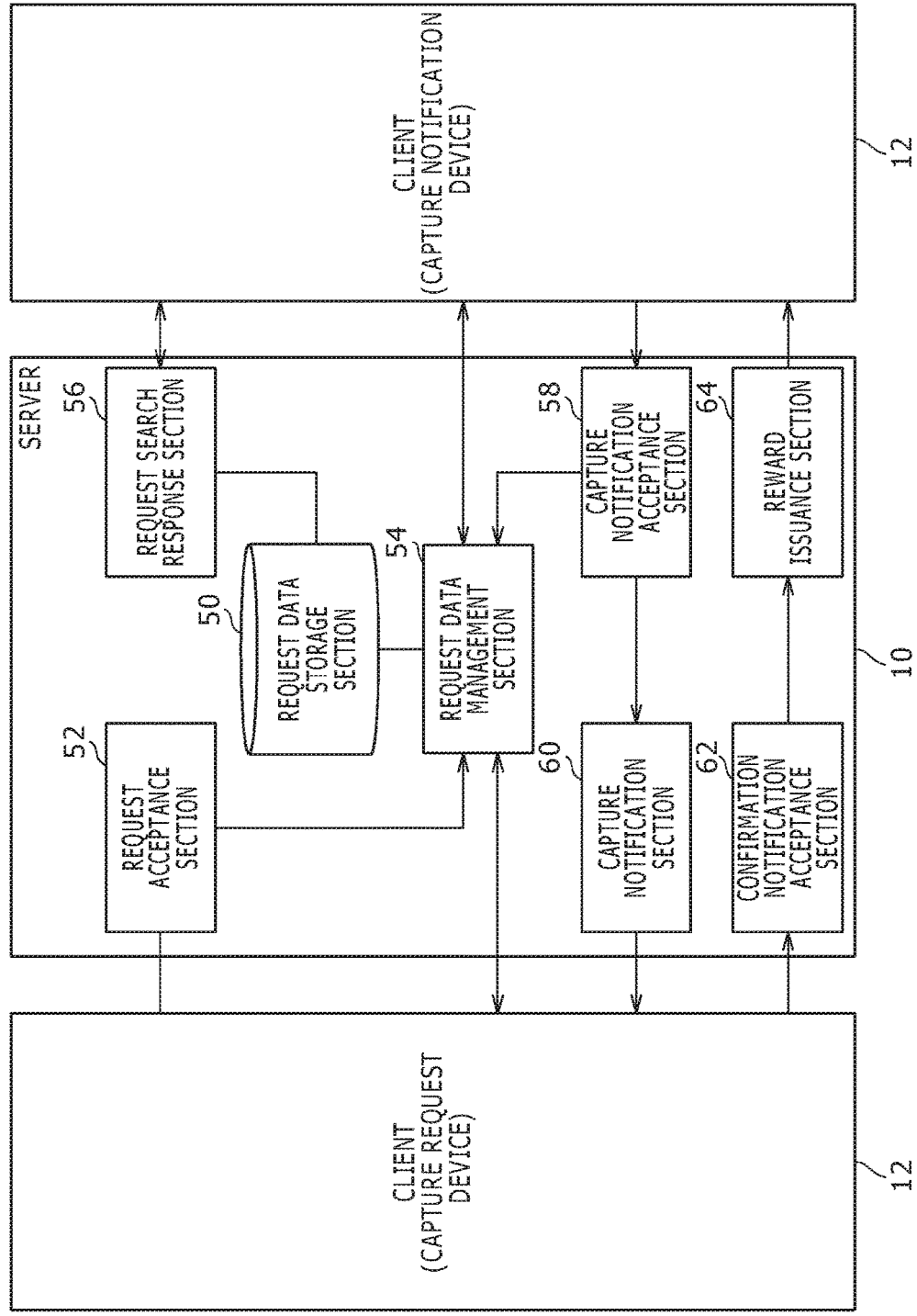

FIG.10

| | |
|---|---|
| SERVER P | 2/4 |
| ☆ SERVER Q | 11/16 |
| SERVER R | 7/10 |
| SERVER S | 10/10 |
| ☆ SERVER T | 8/10 |
| SERVER U | 0/6 |

▽

INFORMATION PROCESSING DEVICE, INFORMATION PROCESSING METHOD, PROGRAM, INFORMATION STORING MEDIUM, INFORMATION PROCESSING SYSTEM, AND MANAGEMENT DEVICE

TECHNICAL FIELD

The present invention relates to an information processing device, an information processing method, a program, an information storage medium, an information processing system, and a management device.

BACKGROUND ART

Technologies are available for capturing a play image that indicates details of the game in progress. PLT 1 discloses, as an example of such technologies, a technology for capturing a game screen image if a given screenshot operation is performed while a game program is under execution.

CITATION LIST

Patent Literature

US Patent Application Publication No. 2009/0118008

SUMMARY

Technical Problem

If a user can request capture of a desired play image, it is possible for the user to view the desired play image without playing the game by acquiring a captured image of the play image in question from a party to whom capture has been requested. However, the technology described in PLT 1 does not allow a user to request capture of a desired play image.

The present invention has been devised in light of the foregoing, and it is an object of the present invention to provide an information processing device, an information processing method, a program, an information storage medium, an information processing system, and a management device for allowing a user to request capture of a desired play image.

Solution to Problem

In order to solve the above problem, an information processing device according to the present invention includes a capture condition data transmission section and a confirmation process execution section. The capture condition data transmission section transmits capture condition data representing a condition for capturing a play image that indicates details of a game in progress. The confirmation process execution section executes a confirmation process for capture of the play image appropriate to the condition represented by the capture condition data.

In one mode of the present invention, the capture condition data transmission section transmits the capture condition data representing a condition to the effect that, in the game, an event must occur that relates to a user who is different from a user using the information processing device and a user using a device adapted to capture the play image. The confirmation process execution section executes a confirmation process for capture of the play image in response to occurrence of the event.

Further, in one mode of the present invention, the information processing device further includes an acceptance section that accepts a captured image of the play image.

Alternatively, the information processing device further includes an acceptance section that accepts an address of a site that allows a captured image of the play image to be browsed.

Further, another information processing device according to the present invention includes a capture condition data storage section and a notification section. The capture condition data storage section stores capture condition data that represents a condition for capturing a play image that indicates details of a game in progress. The notification section notifies capture of the play image appropriate to the condition represented by the capture condition data.

In one mode of the present invention, the capture condition data storage section stores the capture condition data representing a condition to the effect that, in the game, an event must occur that relates to a user different from a user who is notified of capture of the play image and a user using the information processing device. The notification section notifies capture of the play image in response to occurrence of the event.

Further, in one mode of the present invention, the information processing device further includes a display control section that indicates, in an identified manner, a portion that relates to a user different from a user who is notified of capture of the play image and a user using the information processing device.

Still further, in one mode of the present invention, the notification section transmits a captured image of the play image.

Still further, in one mode of the present invention, the notification section transmits an address of a site that allows a captured image of the play image to be browsed.

Still further, an information processing method according to the present invention includes a step of transmitting capture condition data representing a condition for capturing a play image that indicates details of a game in progress. The information processing method further includes a step of executing a confirmation process for capture of the play image appropriate to the condition represented by the capture condition data.

Still further, another information processing method according to the present invention includes a step of storing capture condition data representing a condition for capturing a play image that indicates details of a game in progress. The information processing method further includes a step of notifying capture of the play image appropriate to the condition represented by the capture condition data.

Still further, a program according to the present invention causes a computer to perform a step of transmitting capture condition data representing a condition for capturing a play image that indicates details of a game in progress. The program further causes a computer to perform a step of executing a confirmation process for capture of the play image appropriate to the condition represented by the capture condition data.

Still further, another program according to the present invention causes a computer to perform a step of storing capture condition data that represents a condition for capturing a play image that indicates details of a game in progress. The program further causes a computer to perform a step of notifying capture of the play image appropriate to the condition represented by the capture condition data.

Still further, a information storage medium according to the present invention is a computer-readable information storage medium that stores a program. The program causes a computer to perform a step of transmitting capture condition data representing a condition for capturing a play image that indicates details of a game in progress. The program further causes a computer to perform a step of executing a confirmation process for capture of the play image appropriate to the condition represented by the capture condition data.

Still further, another information storage medium according to the present invention is a computer-readable information storage medium that stores a program. The program causes a computer to perform a step of storing capture condition data that represents a condition for capturing a play image that indicates details of a game in progress. The program further causes a computer to perform a step of notifying capture of the play image appropriate to the condition represented by the capture condition data.

Still further, an information processing system according to the present invention includes first and second information processing devices. The first information processing device includes a capture condition data transmission section that transmits, to the second information processing device, capture condition data representing a condition for capturing a play image that indicates details of a game in progress. The second information processing device includes a capture condition data storage section and a notification section. The capture condition data storage section stores the capture condition data. The notification section notifies the first information processing device of capture of the play image appropriate to the condition represented by the capture condition data. The first information processing device further includes a confirmation process execution section that executes a confirmation process for capture of the play image appropriate to the condition represented by the capture condition data.

Still further, a management device according to the present invention includes a capture condition data reception section, a capture condition data transmission section, a notification acceptance section, and a notification section. The capture condition data reception section receives capture condition data representing a condition for capturing a play image that indicates details of a game in progress. The capture condition data is transmitted from a first information processing device. The capture condition data transmission section transmits the capture condition data to a second information processing device. The notification acceptance section receives, from the second information processing device, a notification of capture of the play image appropriate to the condition represented by the capture condition data. The notification section notifies the first information processing device of an instruction to execute a confirmation process for capture of the play image appropriate to the condition represented by the capture condition data in accordance with reception of the notification.

BRIEF DESCRIPTION OF DRAWINGS

FIG. 3 is a diagram illustrating an example of request data.

FIG. 4 is a diagram illustrating an example of a list screen.

FIG. 5 is a diagram illustrating an example of agreement request data.

FIG. 6C is a functional block diagram illustrating an example of functions implemented by a server according to the embodiment of the present invention.

FIG. 10 is a diagram illustrating an example of a screen displaying a game server list.

DESCRIPTION OF EMBODIMENTS

A detailed description will be given below of an embodiment of the present invention on the basis of the accompanying drawings.

Figure 1:
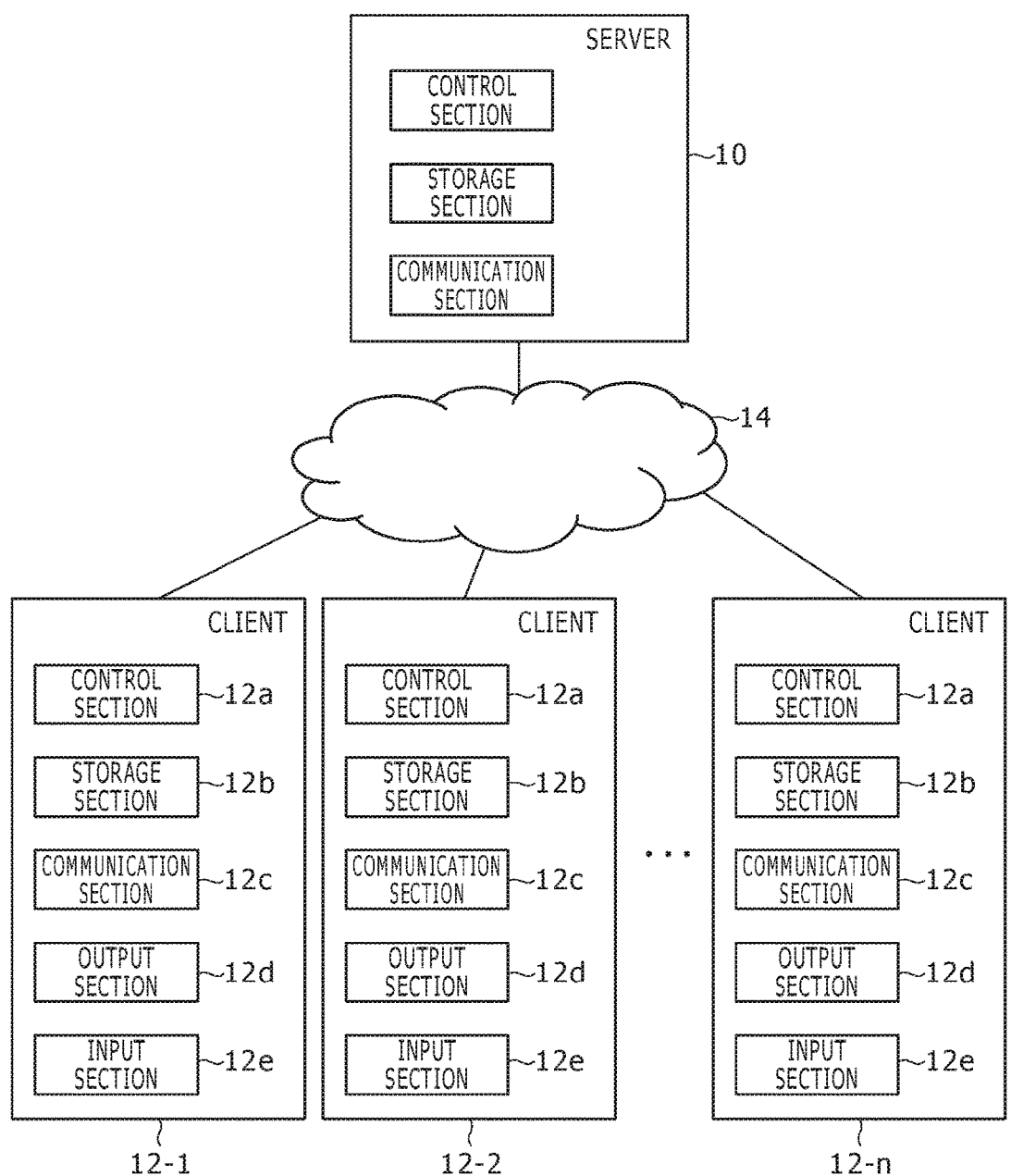
FIG. 1 is a diagram illustrating an example of an overall configuration of a game system according to an embodiment of the present invention.

FIG. 1 is a diagram illustrating an example of an overall configuration of a game system 1 according to an embodiment of the present invention. As illustrated in FIG. 1, the game system 1 according to the present embodiment includes a server 10 and clients 12 (12-1, 12-2, and so on, up to 12-n). The server 10 and the clients 12 are each made up primarily of a computer. The server 10 and the clients 12 are connected to a computer network 14 such as the Internet. Then, the server 10 and the clients 12 can communicate with each other.

The server 10 is a server computer that manages data shared by the clients 12. The server 10 includes, for example, a control section 10a, a storage section 10b, and a communication section 10c as illustrated in FIG. 1. The control section 10a is, for example, a program-controlled device such as CPU, handling various information processing tasks in accordance with the program stored in the storage section 10b. The storage section 10b is, for example, storage elements such as ROM and RAM and a hard-disk drive. The communication section 10c is, for example, a communication interface that exchanges data with the clients 12 via the computer network 14. The server 10 transmits and receives information to and from each of the clients 12 via the communication section 10c.

The clients 12 are computers used by users that are, for example, personal computers, game consoles, TV receivers, portable game devices, portable digital assistants, and so on. In the present embodiment, the program of a game played by users is installed in each of the clients 12. Then, the user of each of the clients 12 plays the game as a player thereof.

Each of the clients 12 includes, for example, a control section 12*a*, a storage section 12*b*, a communication section 12*c*, an output section 12*d*, and an input section 12*e*. The control section 12*a* is, for example, a program-controlled device such as CPU, handling various information processing tasks in accordance with the program stored in the storage section 12*b*. The control section 12*a* according to the present embodiment also includes a GPU (Graphics Processing Unit) that draws an image in a frame buffer on the basis of graphics commands and data supplied from the CPU. The storage section 12*b* is, for example, storage elements such as ROM and RAM and a hard-disk drive. The storage section 12*b* stores, for example, programs executed by the control section 12*a*. Further, a frame buffer area in which images are drawn by the GPU is reserved in the storage section 12*b* according to the present embodiment. The communication section 12*c* is, for example, a communication interface that exchanges data with the server 10 via the computer network 14. Each of the clients 12 transmits and receives information to and from the server 10 and the other clients 12 via the communication section 12*c*. The output section 12*d* is a display section such as display that outputs information and an audio output section such as speaker that produces audio output in accordance with an instruction supplied from the control section 12*a*. The input section 12*e* is, for example, a game controller, a touch pad, a mouse, a keyboard, a microphone, a camera, and so on that outputs details of operations performed by the user to the control section 12*a*.

In the present embodiment, the user of each of the clients 12 can request the users of the other clients 12 to capture a play image that indicates details of the game in progress. Then, the requested user can accept a request for capture of the play image. A description will be given below with focus on a case in which a user B who uses the client 12-2 requests a user A who uses the client 12-1 to capture a play image and the user A agrees to the request. Further, we assume below that the users A and B play various games respectively as players A and B.

Figure 2:
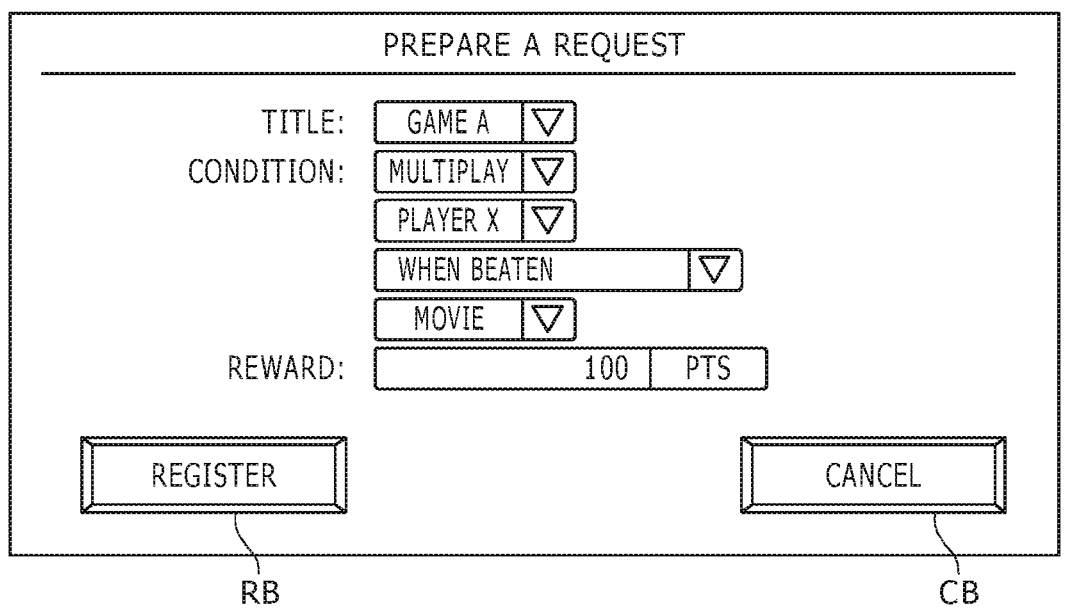
FIG. 2 is a diagram illustrating an example of a request screen.

FIG. 2 is a diagram illustrating an example of a request screen for requesting capture of a play image. The request screen appears on the display when a system screen appears on the display of the client 12-2 or when the user B performs a given operation while playing a game. If the user B performs an operation of selecting a cancel button CB in the request screen illustrated in FIG. 2, the screen appearing on the display is updated to the one that had been appearing immediately before the request screen appeared. If the user B specifies a condition for capturing a play image first and then performs an operation of selecting a register button RB in the request screen illustrated in FIG. 2, request data illustrated in FIG. 3 is registered in the server 10.

The request data is associated with a request for capturing a play image. As illustrated in FIG. 3, the request data includes a request ID, a requesting player ID, reward data, difficulty data, fulfillment status data, and capture condition data.

The request ID is identification information of the request data. In the present embodiment, a unique value that does not overlap with the ID of any other request data managed by the server 10 is specified as a request ID.

The requesting player ID is identification information of the player who requested capture of the play image associated with the request data.

The reward data represents a reward gained by the player who has fulfilled the request. The points represented by each piece of reward data correspond, for example, to those used in a game or those required to be purchased to play a game. In the present embodiment, users can specify a reward data value via the request screen illustrated in FIG. 2.

The difficulty data represents difficulty involved in fulfilling the request. In the present embodiment, the difficulty data value is one of "S," "A," "B," and "C," with "S" being the most difficult, and "A," "B," and "C" decreasing in difficulty in this order.

The fulfillment status data represents whether or not the request represented by the request data has been fulfilled. "Fulfilled" is specified as a fulfillment status data value when the request has been fulfilled. On the other hand, "Unfulfilled" is specified as a fulfillment status data value if the request has yet to be fulfilled. If new request data is registered, "Unfulfilled" is specified as a fulfillment status data value for the request data.

The capture condition data represents a condition for capturing a play image. In the present embodiment, this data includes, for example, title data, event data, and captured image type data.

The title data represents the game title whose play image is to be captured. In the present embodiment, users can specify a title data value via the request screen illustrated in FIG. 2.

The event data represents the event specified in the request data. In the present embodiment, the event data represents the event that takes place in the game whose title is represented by the title data associated with the event data in question in the request data. In the present embodiment, users can specify an event data value via the request screen illustrated in FIG. 2. For example, "Beat player X" is specified as an event indicated by the event data for the request data whose request ID is "0104." In this example, the player X is specified as an individual with a bounty by a player B. Thus, as an event indicated by the event data, an event relating to a player specified as an individual with a bounty such as beating the player in question may be specified rather than an event relating to a player who requests capture or a player who agrees to capture.

The captured image type data represents the type of image to be captured. In the present embodiment, "Movie" or "Still image" is specified as a captured image type data value. In the present embodiment, users can specify a captured image type data value via the request screen illustrated in FIG. 2.

Then, in the present embodiment, the list screen illustrated in FIG. 4 is generated on the basis of the request data illustrated in FIG. 3. FIG. 4 is a diagram illustrating an example of a list screen of values specified in the request data for a game A. This screen appears on the display of the client 12-1. The list screen is generated on the basis of the request data that includes the title data whose value is "Game A."

In the list screen, request information RI, each associated with the request data, is arranged one above the other. The user A can change the order in which the request information RI is arranged by using a pulldown menu arranged in the list screen. In the list screen illustrated in FIG. 4, the request information RI is arranged in the order of most to least recent from top to bottom. It should be noted that the request information RI may be arranged in the order of number of user requests agreed to or a difficulty level. The request information RI arranged in the list screen of FIG. 4 is associated with the request data whose request ID values are each "0104," "0103," "0102," and "0101."

The request information RI includes a player icon PI, reward information RWI, difficulty information DI, and a request details character string RS. The player icon PI is associated with the requesting player ID included in the request data. In FIG. 4, player icons PI(a), PI(b), and PI(c) are arranged that are associated with the players A and B, and C, respectively. The reward information RWI represents the reward indicated by the reward data included in the request data. The difficulty information DI represents the difficulty indicated by the difficulty data included in the request data. The request details character string RS represents the combination of the event indicated by the event data and the type indicated by the captured image type data included in the request data.

It should be noted that, in the present embodiment, the elements included in the request information RI, and in this case, the player icon PI, the reward information RWI, the difficulty information DI, and the request details character string RS, appear in a manner appropriate to the fulfillment status data value included in the request data. More specifically, for example, the luminosity of an element associated with request data whose fulfillment status data value is "Unfulfilled" is higher than that of an element associated with request data whose fulfillment status data value is "Fulfilled."

Further, in the present embodiment, the request information RI arranged in the list screen is a link. Then, when the user A performs an operation of selecting one piece of the request information RI, this means that the user A has agreed to the request associated with the selected request information RI. As a result, agreement request data illustrated in FIG. 5 is stored in the storage section 12b of the client 12-1 used by the user A. In the present embodiment, a play image is captured in the client 12-1 on the basis of the agreement request data stored in the client 12-1.

Further, in the present embodiment, the request information RI based on the request data containing the request of the user A as the player A is arranged in the list screen illustrated in FIG. 4. The list screen appears on the display of the client 12, and the user A uses the client 12 in question. Then, in the present embodiment, even if the user A performs an operation of selecting the request information RI, the user A cannot agree to the request associated with the request information RI in question. It should be noted that the user A may be able to agree to the request associated with the request information RI in question when the user A performs an operation of selecting the request information RI.

The agreement request data includes an agreement request ID, a requesting player ID, reward data, difficulty data, title data, event data, captured image type data, and timing relationship data as illustrated in FIG. 5.

The agreement request ID is type information of agreement request data. The request ID included in the request data that is associated with the selected request information RI is specified as the agreement request ID in question included in the agreement request data.

The requesting player ID, the reward data, the difficulty data, and capture condition data included in the agreement request data are associated with the requesting player ID, the reward data, the difficulty data, and the capture condition data included in the request data, respectively. Then, the values of the data included in the request data associated with the selected request information RI are specified for these pieces of data included in the agreement request data.

The timing relationship data represents the relationship in timing between occurrence of the event indicated by the event data that is included in the agreement request data in question and capture of a play image. The timing relationship data represents, for example, the difference in timing between occurrence of the event indicated by the event data that is included in the agreement request data in question and capture of a play image. Then, in the present embodiment, a value is specified for the timing relationship data in accordance with the rules specified in advance in the server 10 or the client 12 in question.

A further description will be given of capture of a play image in accordance with a request agreed to.

In the present embodiment, while a game in which the user of the client 12 participates is in progress, a play image that indicates details of the game in progress appears on the display of the client 12 in question at a given frame rate. Then, a copy of the play image that appears on the display, that is, a copy of the play image drawn in a frame buffer, is written successively to a ring buffer area that is capable of storing a movie for up to 15 minutes and provided at the storage section of the client 12.

Then, in the present embodiment, when the event indicated by the event data that is included in the agreement request data illustrated in FIG. 5 occurs while the game in question is being played, a movie made up of a play image or a series of play images appropriate to the event is captured. In the present embodiment as described above, when the condition for capturing the play image associated with the agreement request data is satisfied, a movie made up of a play image or a series of play images appropriate to the event is captured. If a play image is captured, the captured play image is stored in the storage section 12b as a captured image. If a movie is captured, the movie in question is encoded first, and then stored in the storage section 12b as a captured movie. A captured movie is made up of a plurality of frame images. It should be noted that the frame rate at which a series of play images are appeared on a display may be the same as or different from the frame rate of a captured movie stored in the storage section 12b. Then, the value of the fulfillment status data included in the request data associated with the request in question is updated to "Fulfilled."

As described above, how a play image is stored is determined on the basis of timing relationship data included in agreement request data. In the example of FIG. 5, "Three minutes before and after occurrence of event" is specified as a timing relationship data value. We assume here, for example, that an event of beating the player X occurs in multiplay while the user A is playing the game A. In this case, a captured movie based on play images that appear from three minutes before to three minutes after the occurrence of the event is stored in the storage section 12b of the client 12-1. It should be noted that if, in the present embodiment, the captured image type data value is "Movie," a captured movie is stored in the storage section 12b, and if the captured image type data value is "Still image," a captured image is stored in the storage section 12b.

In the present embodiment, a captured image or movie is associated with metadata and stored in the storage section 12b. Here, the metadata includes, for example, values of event data included in capture condition data, date and time indicating the time of occurrence of an event, and so on.

Then, in the present embodiment, the capture of a play image as described above is notified to the user, the player associated with the requesting player ID included in the agreement request data, and here, for example, the user B. It should be noted that how the user B is notified does not specifically matter. For example, information to the effect that a play image has been captured may appear on the output section 12d of the client 12-2 used by the user B. Further, for example, an email stating that a play image has been captured may be transmitted to the mail address of the user B. Still further, an application that can receive the above notification may be installed in the smartphone owned by the user B. Then, the capture of the play image may be notified to the user B via a network service to which the application connects. Further, at this time, the captured image or movie may be transmitted to the user B in question.

Still further, in the present embodiment, the captured image or movie stored in the storage section 12b of the client 12 can be uploaded to image posting sites and various other Internet sites. Then, such an uploaded captured image or movie is published, for example, to the user, the player associated with the requesting player ID included in the agreement request data. In this case, the address, such as the URL, of the site to which the captured image or movie has been uploaded may be transmitted to the user B when the play image is captured.

Then, when the user who made the request in question, and here, the user B, performs a given confirmation operation that represents the requested a play image has captured, a confirmation notification for the capture of a play image is transmitted to the server 10. Upon receipt of the confirmation notification, the server 10 issues a reward to the client 12-1 used by the user A. Then, the receipt of the reward is indicated on the display of the client 12-1.

We also assume that when the list screen illustrated in FIG. 4 appears, the user A performs an operation of selecting the request information RI associated with request data whose fulfillment status data value is "Fulfilled." As a result, in the present embodiment, the captured movie or image appropriate to the request in question appears, for example, on the display or the like. For example, the client 12 used by the user A may download a captured movie or image that has been uploaded to an Internet site and indicate the movie or image, for example, on a display or the like when the request in question is fulfilled. The operation of selecting the request information RI associated with request data whose fulfillment status data value is "Fulfilled" will be hereinafter referred to as a fulfilled request selection operation. Further, when the user A performs a fulfilled request selection operation for the request information RI associated with request fulfilled by the user A himself or herself, a captured movie or image appropriate to the request in question may appear, for example, on a display. Further, after a play image captured in response to a fulfilled request selection operation, the play image in question, or the URL to which the play image in question has been uploaded, may be transmitted to the user who requested capture of the play image in question.

Further, in the list screen that appears on the display of the client 12, the request information RI based on request data containing the request of the user using the client 12 in question and the request information RI based on request data containing the request of other user may be arranged in different manners. For example, the request information RI based on the request data containing the request of the user using the client 12 in question and the request information RI based on the request data containing the request of other user may appear in different frames.

Still further, users may be allowed to change the condition represented by capture condition data included in the request data that contains the request of the user in question. This makes it possible, for example, to change the condition represented by capture condition data to the one that is more likely to be fulfilled, that is, the condition that is less difficult if the condition is hardly likely to be fulfilled.

In the present embodiment, the user B can request capture of a desired play image to other user as described above. Then, when the user A agrees to the request in question and captures the play image in question, the capture is notified to the user B. Thus, in the present embodiment, users can request capture of their desired images to other user. More specifically, in the above example, capture of a play image can be requested to other user when an event relating to a player specified as an individual with a bounty occurs such as when the player specified as an individual with a bounty is beaten, for example.

Further, in the present embodiment, if an event indicated by the event data included in the agreement request data occurs in the client 12-1, the client 12-1 is controlled in such a manner as to capture a play image appropriate to the event. For this reason, in the present embodiment, as long as a request is agreed to, a play image appropriate to the request is captured without one having to perform any explicit operation for the capture.

A further description will be given below of requesting capture of a play image, agreeing to the request, capturing a play image, and notifying capture of a play image.

Figure 6A:
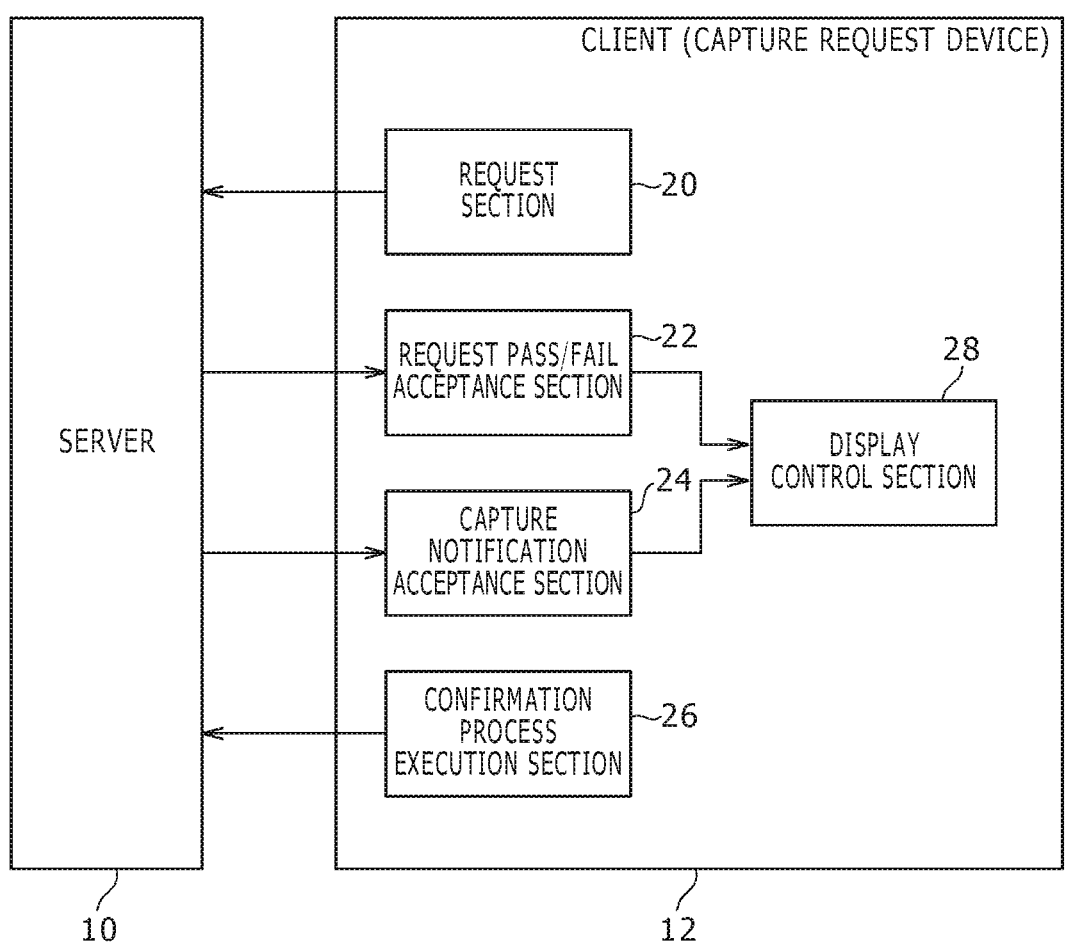
FIG. 6A is a functional block diagram illustrating an example of functions implemented by a capture request device according to the embodiment of the present invention.

FIG. 6A is a functional block diagram illustrating an example of functions implemented by the client 12 according to the present embodiment that requests capture of a play image to other user. It should be noted that not all the functions illustrated in FIG. 6A need to be implemented by the client 12 according to the present embodiment, and that functions other than those illustrated in FIG. 6A may be implemented. The client 12 that requests capture of a play image to other user will be hereinafter referred to as a capture request device.

The capture request device according to the present embodiment functionally includes, for example, a request section 20, a request pass/fail acceptance section 22, a capture notification acceptance section 24, a confirmation process execution section 26, and a display control section 28. The request section 20, the request pass/fail acceptance section 22, and the capture notification acceptance section 24 are primarily implemented as the communication section 12c. The confirmation process execution section 26 is primarily implemented as the control section 12a, the communication section 12c, and the output section 12d. The display control section 28 is primarily implemented as the control section 12a, the storage section 12b, and the output section 12d.

Figure 6B:
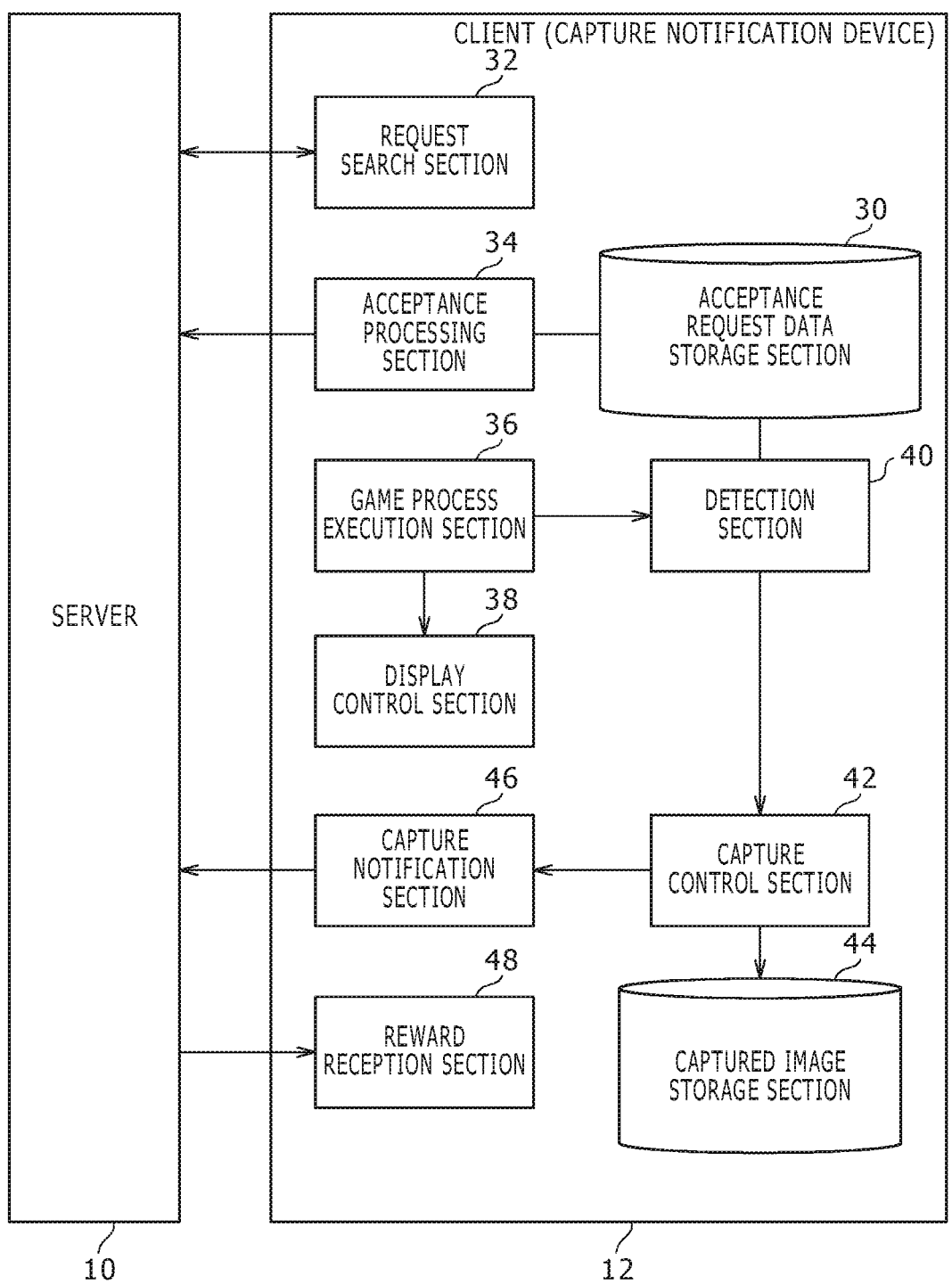
FIG. 6B is a functional block diagram illustrating an example of functions implemented by a capture notification device according to the embodiment of the present invention.

FIG. 6B is a functional block diagram illustrating an example of functions implemented by the client 12 according to the present embodiment that agrees to a request for capture of a play image from other user and captures a play image. It should be noted that not all the functions illustrated in FIG. 6B need to be implemented by the client 12 according to the present embodiment, and that functions other than those illustrated in FIG. 6B may be implemented. The client 12 that agrees to a request for capture of a play image from other user and captures a play image will be hereinafter referred to as a capture notification device.

The capture notification device according to the present embodiment functionally includes, for example, an agreement request data storage section 30, a request search section 32, an agreement processing section 34, a game process execution section 36, a display control section 38, a detection section 40, a capture control section 42, a captured image storage section 44, a capture notification section 46, and a reward reception section 48. The agreement request data storage section 30 and the captured image storage section 44 are primarily implemented as the storage section 12*b*. The request search section 32 and the agreement processing section 34 are primarily implemented as the control section 12*a* and the communication section 12*c*. The game process execution section 36 and the detection section 40 are primarily implemented as the control section 12*a*. The display control section 38 is primarily implemented as the control section 12*a*, the storage section 12*b*, and the output section 12*d*. The capture control section 42 is primarily implemented as the control section 12*a* and the storage section 12*b*. The capture notification section 46 and the reward reception section 48 are primarily implemented as the communication section 12*c*.

It should be noted that the functions of both the capture requesting and notification devices may be implemented in the single client 12.

Then, the above functions are implemented as a result of execution of a program installed in the client 12, a computer, and including instructions corresponding to the above functions by the control section 12*a* of the client 12. The program may be supplied to the client 12 via a computer-readable information storage medium such as an optical disc, a magnetic disk, a magnetic tape, a magneto-optical disc, or a flash memory. Further, the program may be supplied to the client 12 via a computer network such as the Internet.

The request section 20 of the capture request device transmits, to the server 10, a request for capture of a play image to other user. In the present embodiment, the capture request in question is associated with the above capture condition data. Thus, the request section 20 serves as a capture condition data transmission section that transmits capture condition data representing a condition for capture of a play image in the present embodiment. Further, the request section 20 may transmit capture condition data representing a condition to the effect that, in the game, an event must occur that relates to a user specified as an individual with a bounty.

The request pass/fail acceptance section 22 of the capture request device accepts data indicating whether or not the server 10 has accepted a capture request from the request section 20.

The capture notification acceptance section 24 of the capture request device accepts a notification to the effect that the play image whose capture was requested has been captured. Further, the capture notification acceptance section 24 may accept a notification to the effect that a play image appropriate to an event is captured when an event occurs that relates to a user specified as an individual with a bounty. Further, the capture notification acceptance section 24 may accept a captured image or movie as described above. Still further, the capture notification acceptance section 24 may accept an address of a site where a captured image or movie can be browsed as described above.

The confirmation process execution section 26 of the capture request device executes a confirmation process for capture of a play image appropriate to the condition represented by the capture condition data. In the present embodiment, for example, the confirmation process execution section 26 of the capture request device transmits, to the server 10, a confirmation notification for capture of the play image in response to a given confirmation operation by the user. Further, in the present embodiment, for example, the confirmation process execution section 26 of the capture request device indicates the captured image or movie, a play image captured in response to the request, on a display or other device in accordance with the fulfilled request selection operation. Thus, a possible confirmation process in the present embodiment would be to transmit a confirmation or indicate a captured play image or the like. Further, the confirmation process execution section 26 may execute a confirmation process for capture of a play image in response to an event relating to a player specified as an individual with a bounty.

The display control section 28 of the capture request device generates a request screen illustrated, for example, in FIG. 2, indicating the screen on the display.

The agreement request data storage section 30 of the capture notification device stores agreement request data illustrated in FIG. 5. Thus, the agreement request data storage section 30 serves as a capture condition data storage section that stores capture condition data representing a condition for capturing a play image in the present embodiment.

The request search section 32 of the capture notification device searches the server 10 for request data. For example, the request search section 32 transmits, to the server 10, a search condition for request data. Then, the request search section 32 receives request data that matches the search condition from the server 10. Thus, the request search section 32 serves as a capture condition data reception section that receives capture condition data representing a condition for capturing a play image in the present embodiment. Further, the request search section 32 may receive capture condition data representing a condition to the effect that an event must occur that relates to a user specified as an individual with a bounty.

The agreement processing section 34 of the capture notification device generates agreement request data on the basis of request data selected by the user using the capture notification device from among those pieces of request data received by the request search section 32, storing the generated agreement request data in the agreement request data storage section 30. Further, the agreement processing section 34 transmits, to the server 10, the agreement request ID included in the generated agreement request data.

The game process execution section 36 of the capture notification device executes the game program installed in the client 12.

The display control section 38 of the capture notification device generates a play image at a given frame rate in accordance with the execution status of the game program by the game process execution section 36, indicating the generated play image on a display. Further, the display control section 38 writes a copy of the play image displayed as described above to the ring buffer area.

The detection section 40 of the capture notification device detects an event that occurs during a game play. In the present embodiment, the detection section 40 detects an event that occurs in the game as a result of execution of the game program by the game process execution section 36. It should be noted that the detection section 40 may detect the event in question by accepting information, notified by the game process execution section 36, to the effect that the event in question must occur. Further, the detection section 40 may detect an event by verifying at a given frame rate whether or not the event in question has occurred.

The capture control section 42 of the capture notification device identifies a capture timing in response to detection of an event by the detection section 40 on the basis of the timing relationship data, controlling capture so that a play image is captured at the capture timing in question. In the present embodiment, the capture control section 42 captures a play image at the identified capture timing, storing the play image in the captured image storage section 44. Here, if the captured image type data value included in the capture condition data is "Movie," the captured movie is stored. If the captured image type data value is "Still image," the captured image is stored. Further, the capture control section 42 associates metadata with a captured movie or image as described above, storing the movie or image in the captured image storage section 44.

The captured image storage section 44 of the capture notification device stores images captured by the capture control section 42. In the present embodiment, captured movies and images associated with metadata are stored.

The capture notification section 46 of the capture notification device notifies capture of a play image that satisfies the condition represented by the capture condition data that is included in the agreement request data. It should be noted that a capture notification of a play image may be, for example, indicated on the display of the capture notification device when the image is captured. More specifically, for example, the capture notification section 46 may indicate, on the display, that a play image has been captured. This makes the user using the capture notification device aware of capture of a play image. Further, the capture notification section 46 may notify that a play image appropriate to an event is captured when an event occurs that relates to a user specified as an individual with a bounty. Still further, the capture notification section 46 may transmit a captured image or movie as described above. Still further, the capture notification section 46 may transmit the address of a site where a captured image or movie can be browsed as described above.

The reward reception section 48 of the capture notification device receives a reward from the server 10.

FIG. 6C is a functional block diagram illustrating an example of functions implemented by the server 10 according to the present embodiment. It should be noted that not all the functions illustrated in FIG. 6C need to be implemented by the client 12 according to the present embodiment, and that functions other than those illustrated in FIG. 6C may be implemented.

The server 10 according to the present embodiment functionally includes, for example, a request data storage section 50, a request acceptance section 52, a request data management section 54, a request search response section 56, a capture notification acceptance section 58, a capture notification section 60, a confirmation notification acceptance section 62, and a reward issuance section 64. The request data storage section 50 is primarily implemented as the storage section 10b. The request acceptance section 52, the request search response section 56, the capture notification acceptance section 58, the capture notification section 60, and the confirmation notification acceptance section 62 are primarily implemented as the communication section 10c. The request data management section 54 and the reward issuance section 64 are primarily implemented as the control section 10a and the communication section 10c. Then, as described above, the server 10 according to the present embodiment serves as a capture management device that manages requests for and agreement to capture and notification of play image capture.

Then, the above functions are implemented as a result of execution of a program installed in the server 10, a computer, and including instructions corresponding to the above functions by the control section 10a of the server 10. The program may be supplied to the server 10 via a computer-readable information storage medium such as an optical disc, a magnetic disk, a magnetic tape, a magneto-optical disc, or a flash memory. Further, the program may be supplied to the server 10 via a computer network such as the Internet.

The request data storage section 50 of the server 10 stores request data illustrated in FIG. 3.

The request acceptance section 52 of the server 10 accepts a capture request from the request section 20 of the capture request device. Thus, the request acceptance section 52 serves as a capture condition data reception section that receives capture condition data representing a condition for capturing a play image from the capture request device in the present embodiment.

The request data management section 54 of the server 10 handles tasks such as generating and updating request data and storing request data in the request data storage section 50.

The request search response section 56 of the server 10 searches the request data storage section 50 for request data on the basis of a search condition accepted from the request search section 32 of the capture notification device. Then, the request search response section 56 transmits the request data, the search result, to the capture notification device. Thus, the request search response section 56 serves as a capture condition data transmission section that transmits capture condition data to the capture notification device.

The capture notification acceptance section 58 of the server 10 accepts, from the capture notification device, a notification of capture of a play image that satisfies the condition represented by the capture condition data that is included in the agreement request data.

The capture notification section 60 of the server 10 notifies the capture request device of an instruction to confirm the capture of the play image in question in response to acceptance of the notification. In the present embodiment, the capture notification section 60 notifies the capture request device that the play image in question has been captured.

The confirmation notification acceptance section 62 of the server 10 accepts the confirmation notification for the capture of the play image from the confirmation process execution section 26 of the capture request device.

The reward issuance section 64 of the server 10 issues a reward to the user using the capture notification device in response to acceptance of the confirmation notification for the capture of the play image by the confirmation notification acceptance section 62 of the server 10.

Figure 7:
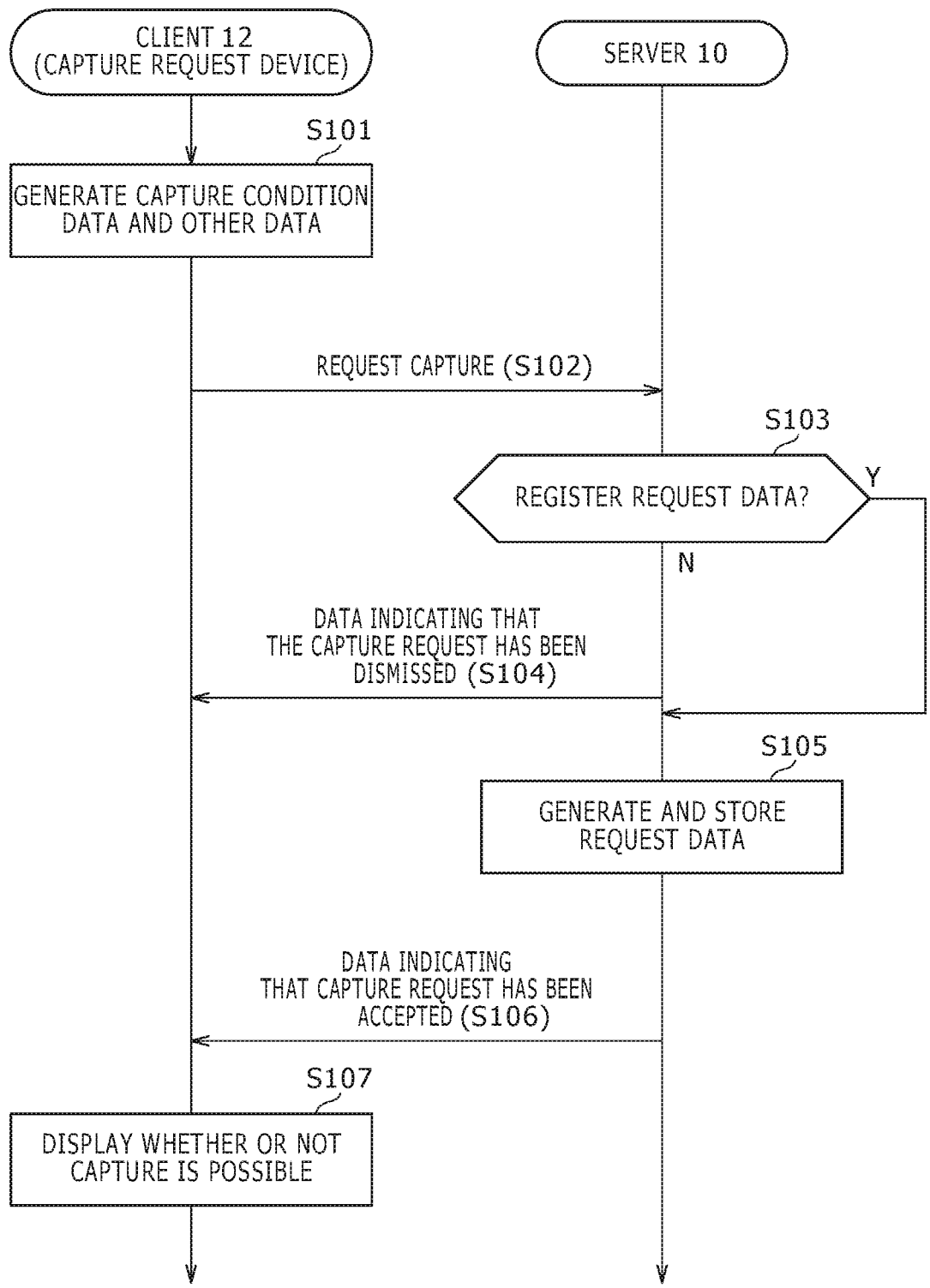
FIG. 7 is a flowchart illustrating an example of steps performed by the capture request device and the server according to the embodiment of the present invention.

A description will be given here of an example of a flow of a request registration process performed by the capture request device and the server 10 according to the present embodiment with reference to the flowchart illustrated in FIG. 7. We assume here that the user B uses the client 12-2 as a capture request device.

First, the request section 20 of the capture request device generates capture condition data and reward data in response to a request registration operation performed by the user B (S101).

In the present embodiment, for example, the request section 20 generates capture condition data and reward data in response to an operation of selecting the register button RB in the request screen illustrated in FIG. 2 on the basis of the values entered in the request screen. In the example of FIG. 2, capture condition data is generated that includes title data whose value is "Game A," event data whose value is "When player X is beaten in multiplay," and captured image type data whose value is "Movie." Further, reward data is generated that has "100 points" as its value.

Then, the request section 20 transmits, to the server 10, a capture request that is associated with identification information of the player who is the user of the client 12 in question and capture condition data and reward data generated in the step of S101. Here, identification information of the player who is the user of the client 12 in question is, for example, "Player B." The request acceptance section 52 of the server 10 accepts the capture request in question (S102). Then, the request data management section 54 determines whether or not to register request data including capture condition data associated with the capture request accepted in the process illustrated in S102 on the basis of the capture condition data in question (S103).

Here, for example, the request data management section 54 confirms whether or not request data that includes, as capture condition data, a value identical or similar to that of the capture condition data accepted in the step of S102 is already stored in the request data storage section 50. Then, if it is confirmed that request data is not stored, the request data management section 54 determines that the request data in question is to be registered. If not, the request data management section 54 determines that the request data is not to be registered.

Then, if determining that request data is not to be registered (N in S103), the request data management section 54 transmits, to the capture request device, data indicating that the server 10 did not accept the capture request. The data in question indicates, for example, that the request is to be checked again and that the request has been dismissed. Then, the request pass/fail acceptance section 22 of the capture request device accepts the data in question (S104).

On the other hand, when determining that request data is to be registered (Y in S103), the request data management section 54 generates request data and stores the request data in question in the request data storage section 50 (S105). Here, for example, request data is generated that includes capture condition data and reward data associated with the capture request accepted in the step of S102. A unique value that does not overlap with the request ID of any other request data is specified as a request ID included in the request data in question. Further, identification information associated with the capture request accepted in the step of S102 is specified as a requesting player ID included in the request data in question. "C" is specified, for example, as a difficulty data value in the present embodiment.

Then, the request data management section 54 transmits, to the capture request device, data indicating that the server 10 accepted the capture request. Then, the request pass/fail acceptance section 22 of the capture request device accepts the data in question (S106).

Then, the display control section 28 of the capture request device indicates whether or not capture is possible on the display (S107), terminating the process illustrated in the present example. Here, for example, if the request pass/fail acceptance section 22 accepts data indicating that the server 10 did not accept the capture request in the step of S104, the display indicates that the request is to be checked again and has been dismissed. On the other hand, when the request pass/fail acceptance section 22 accepts data indicating that the server 10 accepted the capture request in the step of S106, the display indicates, for example, that the request has been registered.

In the present embodiment, the request data management section 54 holds, for each piece of the request data stored in the request data storage section 50, data representing the number of users who have accepted the request associated with the request data in question and data representing the times when the request data in question were registered. Then, the request data management section 54 determines, at given time intervals, a difficulty data value for each piece of the request data stored in the request data storage section 50 on the basis of, for example, the number of users who have accepted the request associated with the request data in question and the elapsed times after the registration of the request data in question. For example, a difficulty data value is determined so that the greater the number of users who have accepted the request associated with the request data in question, and the longer the time from the registration, the higher the difficulty. Then, if the value determined is different from the current value, the request data management section 54 updates the difficulty data value in question to the one determined. Further, the request data management section 54 may increase the points represented by the reward data by a given increment when the difficulty data is updated to a higher difficulty level. It should be noted that a difficulty data value may be determined so that the greater the number of users who have accepted the request associated with the request data in question, the higher the difficulty. Further, a difficulty data value may be determined so that the longer the time from the registration, the higher the difficulty.

Figure 8:
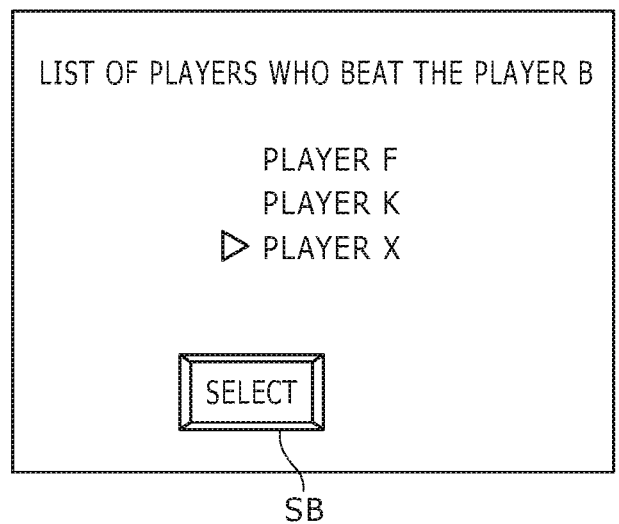
FIG. 8 is a diagram illustrating an example of a player list.

The user interface used to request capture of a play image is not limited to the above. For example, as illustrated in FIG. 8, capture of a play image may be requested via a player list that appears as a system screen of the client 12. FIG. 8 illustrates an example of a list of players who beat the player B. The player list appears on the display of the client 12-2. Here, for example, when an operation is performed to select the player X and the select button SB, capture condition data whose event data value is "When player X is beaten in multiplay" may be generated in the step of S101. Then, in the step of S105, request data whose request ID value is "0104" illustrated in FIG. 3 may be registered in the server 10. In this case, the player X is specified as an individual with a bounty by the player B. Thus, an individual with a bounty may be specified via the player list illustrated in FIG. 8.

Figure 9:
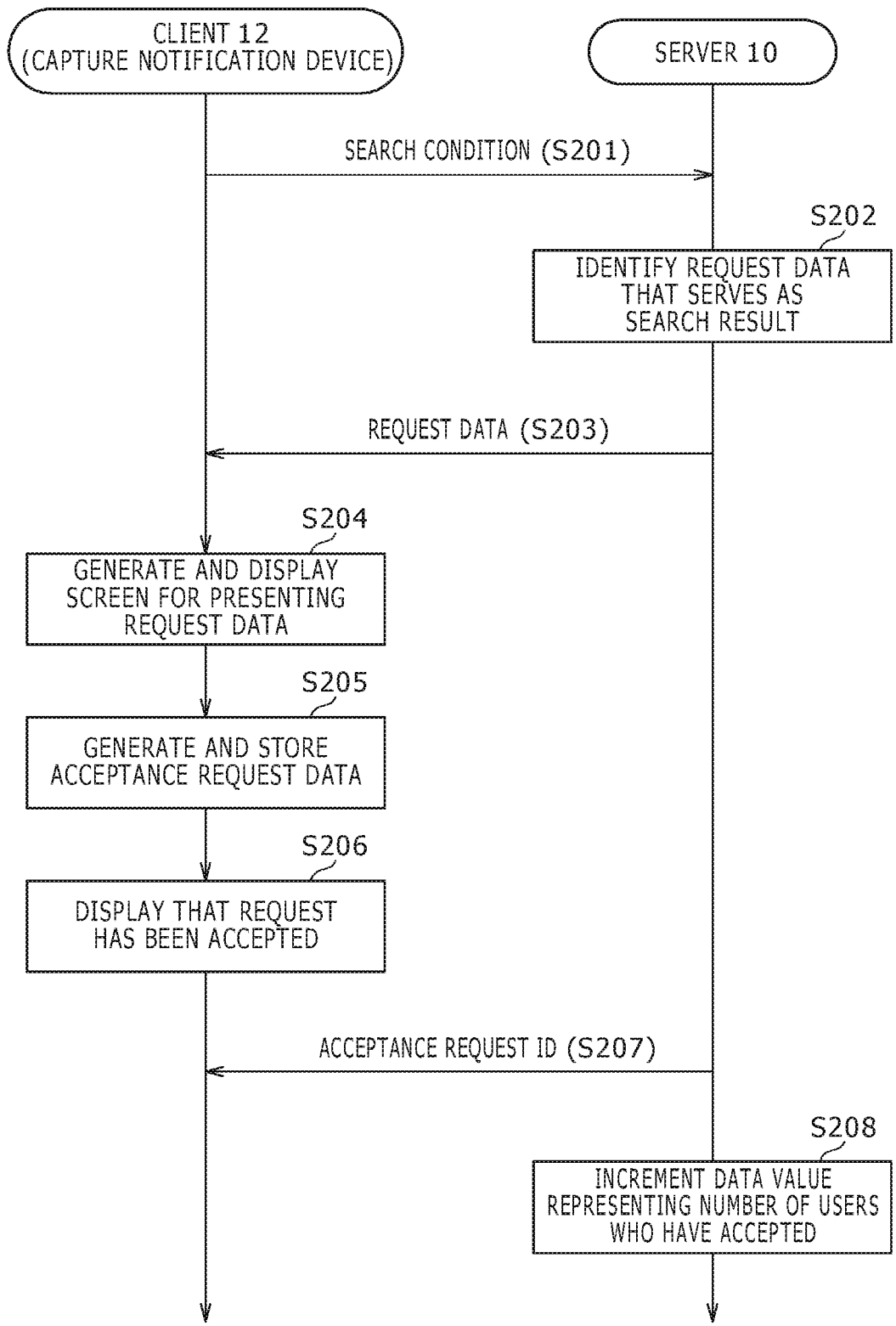
FIG. 9 is a flowchart illustrating an example of steps performed by the capture notification device and the server according to the embodiment of the present invention.

A description will be given next of an example of a flow of a request agreement process performed by the capture notification device and the server 10 according to the present embodiment with reference to the flowchart illustrated in FIG. 9. We assume here that the user A uses the client 12-1 as a capture request device.

First, the request search section 32 of the capture notification device transmits a search condition to the server 10. Then, the request search response section 56 of the server 10 accepts the search condition (S201). In the present embodiment, the search condition to be transmitted is determined in the step of S201 in accordance with a screen that presents request data to the user A. The screen appears in the step of S204 which will be described later. For example, when the list screen illustrated in FIG. 4 appears, a search condition stating that "The title data value is 'Game A'" is transmitted.

Then, the request search response section 56 of the server 10 identifies request data that provides a search result that satisfies the search condition accepted in the step of S201 from among the request data stored in the request data storage section 50 (S202). Then, the request search response section 56 transmits the request data identified in the step of S202 to the capture notification device. As a result, the request search section 32 of the capture notification device accepts the request data in question (S203).

Then, the display control section 38 of the capture notification device generates a screen for presenting request data to the user A on the basis of the request data accepted in the step of S203, indicating the screen on the display (S204). Here, for example, a list screen illustrated in FIG. 4 appears.

Here, when the user A performs an operation of selecting request data to accept, the agreement processing section 34 of the capture notification device generates agreement request data based on the selected request data, storing the request data in the agreement request data storage section 30 (S205). The relationship between the selected request data and agreement request data is as described earlier. Here, request data selection operation corresponds, for example, to the operation of selecting the request information RI when the list screen illustrated in FIG. 4 appears. In this case, agreement request data is generated that is based on the request data associated with the request information RI in question.

Then, the display control section 38 of the capture notification device indicates, on the display, that the request associated with the agreement request data generated in the step of S205 has been accepted (S206).

The agreement processing section 34 of the capture notification device transmits, to the server 10, the agreement request ID included in the agreement request data that was generated in the step of S205, and the request data management section 54 of the server 10 receives the agreement request ID in question (S207). Then, the request data management section 54 increments, by 1, the value of data representing the number of users who have accepted the request data (S208), terminating the process illustrated in the present example. The request data includes, as a request ID, the agreement request ID held by the request data management section 54.

It should be noted that the search condition transmitted to the server 10 is not limited to the above. For example, a search condition specified by the user A may be transmitted in the step of S201.

A search condition appropriate to the status of the game played by the user A as the player A may be transmitted in the step of S201. More specifically, for example, a search condition may be transmitted in the step of S201. The search condition states that data is included that represents an event in the stage or map in which the user is playing. In this case, for example, a play image of the game in question with the request information RI arranged therein may appear in the step of S204.

Further, request data may be actively transmitted to the capture notification device in response to the status of the game played by the user A rather than in response to acceptance of a search condition. In this case, for example, the request information RI associated with received request data may be arranged in a play image.

Further, for example, a screen indicating a list of game servers that can communicate with the client 12 illustrated in FIG. 10 may be displayed by the step of S204. In this case, in the step of S201, a search condition may be transmitted in the step of S201. The search condition includes event data representing an event of beating a player playing in one of the game servers displayed in the screen in question.

Then, in the step of S204, the display control section 38 may exercise control so that a star symbol is arranged to the left of the name of each game server in which the player is indicated as an opponent to beat in the event data included in the request data, a search result, as illustrated in FIG. 10. Thus, in the screen illustrated in FIG. 10, players are displayed, in an identified manner, who are indicated as opponents to beat in the event data included in the request data. Thus, the display control section 38 may display a portion relating to a user specified as an individual with a bounty in an identified manner. Then, in this case, a request for capturing a play image appropriate to the event of beating the player in question may be accepted by participating in the game in question. That is, in this case, agreement request data may be generated on the basis of request data that indicates, as event data, that the player playing in the game server in question must be beaten. In this case, participation in a game corresponds to request data selection operation. Then, in this case, agreement request data is generated in response to participation in the game and stored in the storage section 12b. Then, control is exercised so that a play image appropriate to an event of beating the player in question is captured.

Further, in the step of S201, a search condition may be transmitted which states that beating the player playing in the game server in which the user A is logged as the player A must be specified as an event data value in the step of S201.

Still further, for example, all identification information of the player specified as an individual with a bounty by all players other than the player A may be displayed in a list in the steps of S201 to S204. Still further, for example, all identification information of the player specified as an individual with a bounty by a player registered as a friend of the player A in the server 10 may be displayed. Then, the agreement request data about the event of beating a player may be generated. The player is selected by the player A from among the above players.

Figure 11:
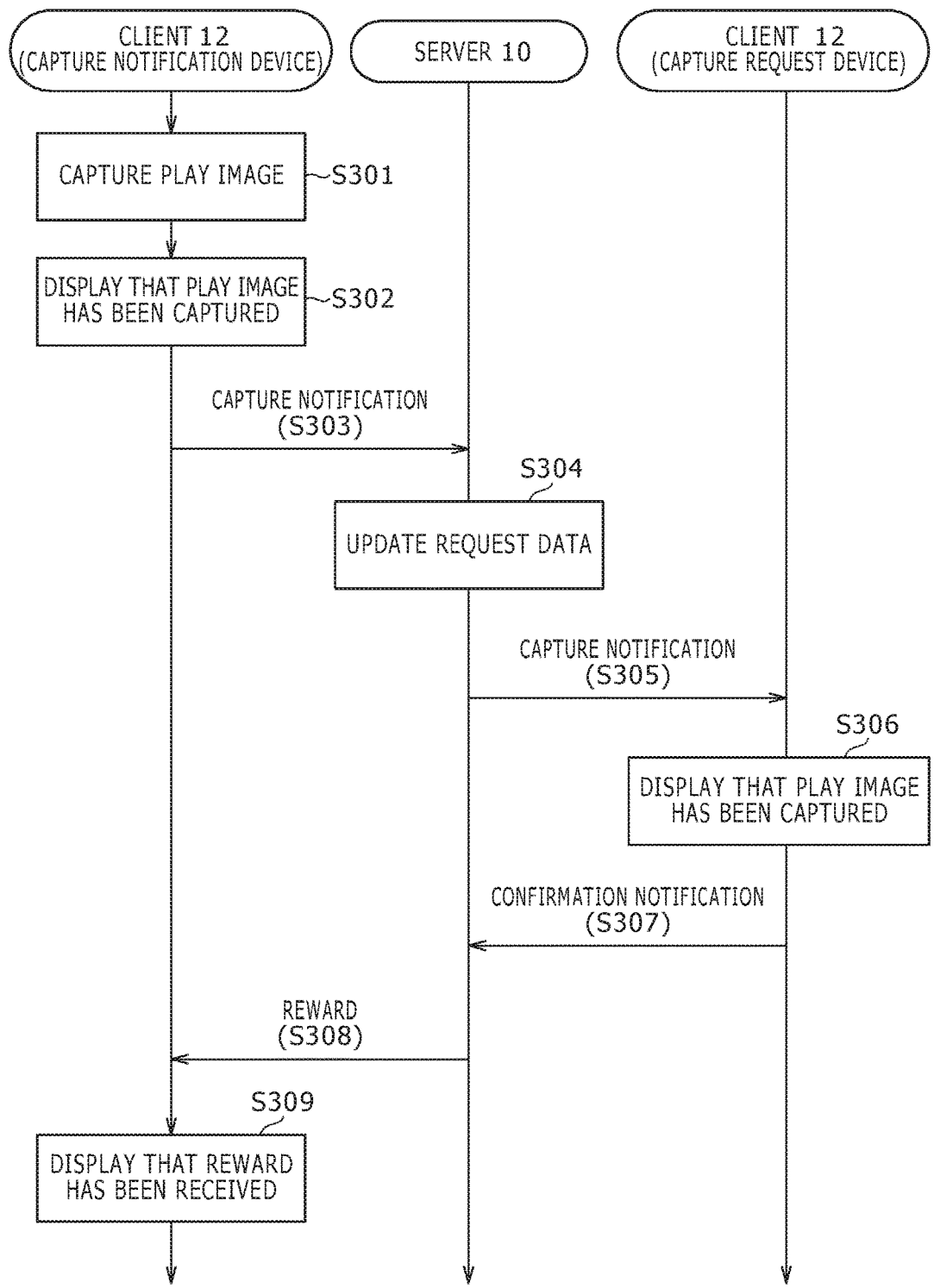
FIG. 11 is a flowchart illustrating an example of steps performed by a game system according to the embodiment of the present invention.

A description will be given next of an example of a flow of a capture notification process performed by the game system 1 according to the present embodiment with reference to the flowchart illustrated in FIG. 11. This process is performed when an event of beating the player X occurs while the user A plays the game A. We assume here that the agreement request data illustrated in FIG. 5 is stored in the agreement request data storage section 30 of the capture notification device.

First, the capture control section 42 of the capture notification device captures a play image in response to detection of the event by the detection section 40 of the capture notification device (S301). What kind of play image is captured here is determined on the basis of the values of the captured image type data and timing relationship data included in the agreement request data as described above. A captured image or movie obtained by capturing a play image is associated with metadata and stored in the captured image storage section 44 as described above. Here, for example, a captured movie based on play images that appear from three minutes before to three minutes after the occurrence of an event of beating the player X is stored in the captured image storage section 44 as described above.

Then, the display control section 38 of the capture notification device indicates, on the display, that a play image has been captured (S302). Then, the capture notification section 46 of the capture notification device transmits to the server 10 the notification associated with the agreement request ID that is, in turn, associated with the event data representing the event that occurred in the agreement request data. The notification in question will be hereinafter referred to as a capture notification. Then, the capture notification acceptance section 58 of the server 10 accepts the capture notification in question (S303).

Then, the request data management section 54 of the server 10 updates, to "Fulfilled," the value of the fulfillment status data of the request data that includes, as a request ID, the agreement request ID associated with the capture notification that was accepted in the step of S303 (S304). Then, the capture notification section 60 of the server 10 transmits, to the capture request device, the capture notification accepted in the step of S303. Then, the capture notification acceptance section 24 of the capture request device accepts the capture notification in question (S305). Here, the capture notification section 60 can identify, on the basis of the requesting player ID included in the request data, the capture request device to which to transmit the capture notification.

Then, the display control section 28 of the capture request device indicates, on the display, that the requested play image has been captured (S306). We assume here that the user B performs a given confirmation process. As a result, the confirmation process execution section 26 of the capture request device transmits a confirmation notification to the server 10. As a result, the confirmation notification acceptance section 62 of the server 10 accepts the confirmation notification in question (S307). The confirmation notification is associated with the agreement request ID that was associated with the capture notification accepted in the step of S305.

Then, the reward issuance section 64 of the server 10 issues a reward to the user A. The reward is based on the reward data value of the request data that includes, as a request ID, the agreement request ID associated with the confirmation notification indicated in S307. Here, for example, a reward is transmitted to the capture notification device. Then, the reward reception section 48 of the capture notification device receives the reward in question (S308). Then, the display control section 38 of the capture notification device indicates, on the display, that the reward has been received (S309), terminating the process illustrated in the present example.

As described above, a captured image or movie may be associated with a capture notification. That is, the capture notification section 46 of the capture notification device may transmit a captured image or movie. Then, the capture notification acceptance section 24 of the capture request device may accept the captured image or movie in question. In this case, the user B can confirm, by viewing the captured image or movie in question, that the requested play image has been captured. Further, in the above process example, the user A is notified that a reward has been received because the display indicates a message to that effect. However, the manner in which the user is notified is not limited to what indicates on the display. For example, an email informing that a reward has been received may be transmitted to the mail address of the user A. Further, an application through which the above notification can be received may be installed in the smartphone owned by the user A. Then, the user A may be notified of the receipt of a reward via network service to which the application connects.

Further, the capture notification section 46 of the capture notification device may upload a captured image or movie to an image publishing site or other site as described above. Then, a site address such as that of an image publishing site or other site where the captured image or movie in question can be browsed may be associated with a capture notification. That is, the capture notification section 46 of the capture notification device may transmit the site address where the captured image or movie in question can be browsed. Then, the capture notification acceptance section 24 of the capture request device may accept the address in question. Then, the user B may confirm the captured image or movie, for example, by accessing the URL in question.

It should be noted that a process may be performed that indicates the fulfillment of the request in question in response to a reward. For example, the reward reception section 48 may delete the agreement request data, associated with the reward in question, from the agreement request data storage section 30. Then, the display control section 38 of the capture notification device may indicate, on the display, that the request has been fulfilled.

It should be noted that if a given period of time elapses after a capture notification has been transmitted to the capture request device in the step of S305, the request may be considered as fulfilled, and the reward issuance section 64 may issue a reward.

Further, for example, an evaluation of a captured image or movie may be associated with a confirmation notification. Then, reward points to be issued may be determined on the basis of the evaluation.

Still further, for example, when captured movies appropriate to the event of beating the player X are transmitted to the client 12-2 from a variety of players, the client 12-2 may create a collection of movies made up of the plurality of captured movies in question. Then, the collection of movies in question may be uploaded to an image publishing site or other site. At this time, for example, the collection of movies may be uploaded after having been worked on so that the name of the beaten player, and the player X here, or the name of the player who beat the player X, does not appear.

Still further, data for responding to the event of beating the player X and replaying may be transmitted to the client 12-2 rather than movies. Then, the client 12-2 may generate a movie appropriate to the event of beating the player X by executing the game program and replaying on the basis of the data. Here, among examples of data for replaying are key log data, position coordinate data representing the positon of the player's character object, and posture data representing the posture of the player's character object.

Figure 12:
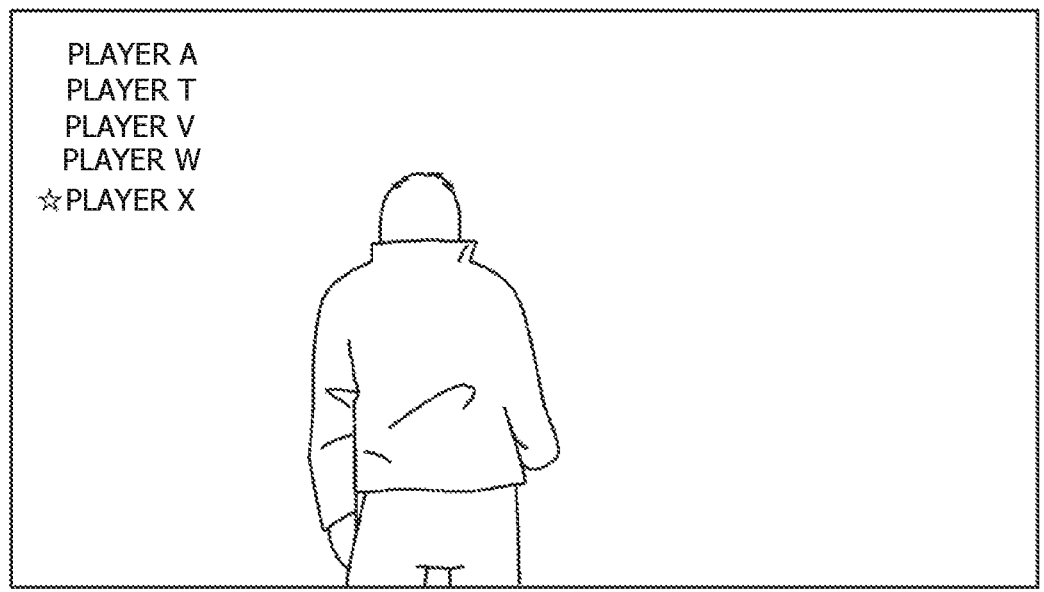
FIG. 12 is a diagram illustrating an example of a game image.
Figure 13:
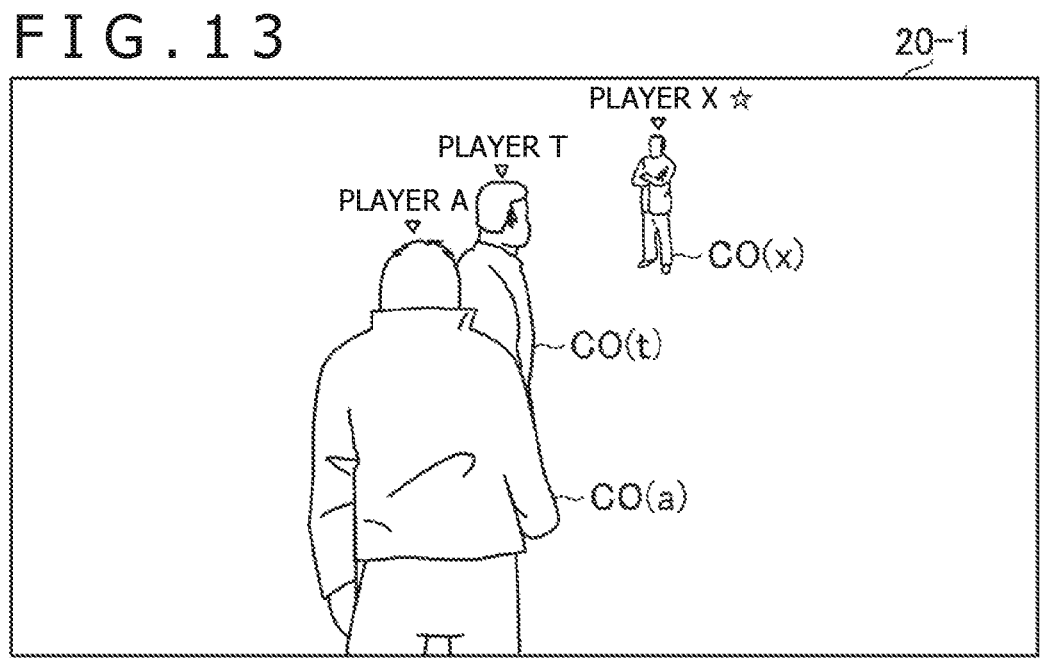
FIG. 13 is a diagram illustrating an example of a game image.

The display control section 38 of the capture notification device may exercise control so that a star symbol is arranged, in a game play image, to the left of the name of the player indicated as an opponent to beat in the event data included in the agreement request data as illustrated in FIG. 12. Further, the display control section 38 of the capture notification device may arrange, in a game play image, a star symbol near a player object CO who is indicated as an opponent to beat in the event data included in the agreement request data as illustrated in FIG. 13. FIG. 13 illustrates a character object CO(a) associated with the player A, a character object CO(t) associated with a player T, and a character object CO(x) associated with the player X. In the images illustrated in FIGS. 12 and 13, players are indicated in an identified manner. These players are indicated as opponents to beat in the event data included in the request data. Thus, the display control section 38 may indicate, in an identified manner, a portion that relates to a player specified as an individual with a bounty within a play image. This makes it easier for a game player to identify, during play of the game, a player to beat such as a player for whose beating a reward can be gained.

Figure 14:
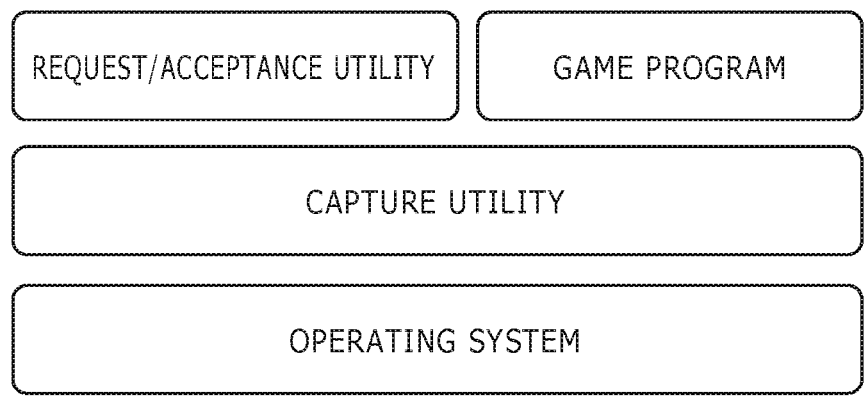
FIG. 14 is an explanatory diagram schematically illustrating an example of software hierarchy of a program executed by a client according to the embodiment of the present invention.

FIG. 14 is an explanatory diagram schematically illustrating an example of software hierarchy of a program executed by the client 12 according to the present embodiment. Among programs executed by the client 12 according to the present embodiment are an operating system, a capture utility that is on a layer above the operating system, and a game program and a request/agreement utility that are on a layer above the capture utility. The capture utility corresponds, for example, to the detection section 40, the capture control section 42, the captured image storage section 44, and so on. The game program corresponds, for example, to the game process execution section 36, and so on. The request/agreement utility corresponds, for example, to the request section 20, the capture notification acceptance section 24, the confirmation process execution section 26, the request search section 32, the agreement processing section 34, the capture control section 42, the capture notification section 46, the reward reception section 48, and so on. Further, the request/agreement utility may perform a process to display a screen that contains a list of game servers illustrated in FIG. 10 and that to display, in an identified manner, a player to beat in a play image generated by a game program as illustrated in FIGS. 12 and 13.

It should be noted that a player specified as an individual with a bounty may be detected by the game program layer rather than the capture utility layer. Further, the detection may be conducted by detecting a character string such as "The player X was beaten" that appears, for example, on the screen by the operating system layer. Still further, beating of the player in question may be detected as a result of the user performing an explicit operation.

It should be noted that the present invention is not limited to the above embodiment.

For example, a request may be agreed to by exchanging a captured image or movie rather than explicitly. More specifically, we assume, for example, that the player A beats the player X without knowing that the player B has specified the player X as an individual with a bounty. In this case, a captured movie appropriate to the event in question of beating the player X may be transmitted from the client 12-1 to the client 12-2.

Further, for example, a condition such as expiry date may be associated with request data or agreement request data. Then, if the condition in question is satisfied such as when the expiry date is overdue, the request data or agreement request data in question may be invalidated and deleted. More specifically, we assume, for example, that event data representing an event about a game is included in agreement request data. In this case, the agreement request data in question may be deleted when the player, the user using the client 12 that stores the agreement request data in question, no longer participates in the game in question. Still further, the agreement request data in question may be deleted when the individual with a bounty specified in the event data that is included in the agreement request data no longer participates in the game in question.

Still further, for example, the request information RI associated with invalidated request data may be not arranged in the list screen. Still further, the request information RI associated with invalidated request data arranged in the list screen may appear in a manner different from the other request information RI. Still further, it may be impossible for the user to agree to the request associated with the request information RI associated with invalidated request data even if he or she performs an operation of selecting the request information RI.

Still further, a captured movie may be delivered through live streaming. For example, a captured movie may be buffered first, and then uploaded to a site providing a live streaming service and published rather than being stored in the storage section 12b of the client 12. Then, the URL of the site in question may be transmitted from the capture notification device to the capture request device.

Further, the server 10 may include a plurality of enclosures. Further, sharing of roles between the server 10 and the clients 12 is not limited to the above. Further, the server 10 and the clients 12 may be combined in one piece.

How the game whose play image is to be captured is implemented in the present embodiment does not specifically matter. For example, the present embodiment may be applied to play image capture in a game that indicates a play image via a browser installed in the client 12 and that is executed on the server side, for example. Further, the present embodiment may be applied to play image capture in a game that is executed on the client side. Still further, the present embodiment may be applied to a game that is made possible by coordination between the programs installed in the server and the client.

Still further, for example, in addition to the above, capture condition data may be a parameter managed within the system of the client 12 and a combination of parameters managed in the played game.

Here, among examples of parameters are a user ID, a region to which the user belongs, a user's gamer rank (trophy rank, gamer score), and game titles owned. Among other examples of parameters managed within the system are playing time of a specific game and shooting time (capture time of a play image).

Further, among examples of parameters managed in the played game are the number of trophies gained in a specific game, the number of opponents beaten, a combo count, a score, and the best time. In addition to the above, a map ID, a location ID, an enemy object ID, an item object ID, an event ID, and a trophy ID in the game are among examples of parameters managed in the played game. In addition to the above, the number of item objects gained, times cleared, times when the trophies were gained, start times, the number of opponents beaten, and change in scores in the game are among examples of parameters managed in the played game. In addition to the above, change in transactions between the clients 12 and the server 10, volume in voice chat, and change in speaker count are among examples of parameters managed in the played game.

Still further, the above specific character strings and character strings in the drawings are illustrative, and the present invention is not limited to these character strings.

The invention claimed is:

1. An information processing device comprising:
  a capture condition data transmission section adapted to transmit capture condition data representing a condition for capturing a play image that indicates details of a game in progress; and
  a confirmation process execution section adapted to execute a confirmation process for capture of the play image appropriate to the condition represented by the capture condition data; wherein
  difficulty data associated with the capture condition data represents difficulty involved in capturing the play image, and
  reward data associated with the capture condition data represents a reward for capturing the play image, and
  at least one of an increase in players of the game seeking the reward and an increase in time since an offering of the reward, effects an increase in the difficulty, and
  an increase in the difficulty effects an increase in the reward, and
  the reward is issued after execution of the confirmation process.

2. The information processing device of claim 1, wherein the capture condition data transmission section transmits the capture condition data representing a condition to the effect that, in the game, an event must occur that relates to a user who is different from a user using the information processing device and a user using a device adapted to capture the play image, and the confirmation process execution section executes a confirmation process for capture of the play image in response to occurrence of the event.

3. The information processing device of claim 1 further comprising: an acceptance section adapted to accept a captured image of the play image.

4. The information processing device of claim 1 further comprising: an acceptance section adapted to accept an address of a site that allows a captured image of the play image to be browsed.

5. An information processing device comprising:
a capture condition data storage section adapted to store capture condition data that represents a condition for capturing a play image that indicates details of a game in progress; and
a notification section adapted to notify capture of the play image appropriate to the condition represented by the capture condition data; wherein
difficulty data associated with the capture condition data represents difficulty involved in capturing the play image, and
reward data associated with the capture condition data represents a reward for capturing the play image, and
at least one of an increase in players of the game seeking the reward and an increase in time since an offering of the reward, effects an increase in the difficulty, and
an increase in the difficulty effects an increase in the reward, and
the reward is issued after notification of the capture.

6. The information processing device of claim 5, wherein
the capture condition data storage section stores the capture condition data representing a condition to the effect that, in the game, an event must occur that relates to a user different from a user who is notified of capture of the play image and a user using the information processing device, and
the notification section notifies capture of the play image in response to occurrence of the event.

7. The information processing device of claim 5 further comprising: a display control section adapted to display, in an identified manner, a portion that relates to a user different from a user who is notified of capture of the play image and a user using the information processing device.

8. The information processing device of claim 5, wherein the notification section transmits a captured image of the play image.

9. The information processing device of claim 5, wherein the notification section transmits an address of a site that allows the captured image of the play image to be browsed.

10. An information processing method comprising:
transmitting capture condition data representing a condition for capturing a play image that indicates details of a game in progress; and
executing a confirmation process for capture of the play image appropriate to the condition represented by the capture condition data; wherein
difficulty data associated with the capture condition data represents difficulty involved in capturing the play image, and
reward data associated with the capture condition data represents a reward for capturing the play image, and
at least one of an increase in players of the game seeking the reward and an increase in time since an offering of the reward, effects an increase in the difficulty, and
an increase in the difficulty effects an increase in the reward, and
the reward is issued after execution of the confirmation process.

11. An information processing method comprising:
storing capture condition data representing a condition for capturing a play image that indicates details of a game in progress; and
notifying capture of the play image appropriate to the condition represented by the capture condition data; wherein
difficulty data associated with the capture condition data represents difficulty involved in capturing the play image, and
reward data associated with the capture condition data represents a reward for capturing the play image, and
at least one of an increase in players of the game seeking the reward and an increase in time since an offering of the reward, effects an increase in the difficulty, and
an increase in the difficulty effects an increase in the reward, and
the reward is issued after notification of the capture.

12. A non-transitory, computer readable recording medium containing a program, which when executed by a computer causes the computer to perform actions, comprising:
by a capture condition data transmission section, transmitting capture condition data representing a condition for capturing a play image that indicates details of a game in progress; and
by a confirmation process execution section, executing a confirmation process for capture of the play image appropriate to the condition represented by the capture condition data; wherein
difficulty data associated with the capture condition data represents difficulty involved in capturing the play image, and
reward data associated with the capture condition data represents a reward for capturing the play image, and
at least one of an increase in players of the game seeking the reward and an increase in time since an offering of the reward, effects an increase in the difficulty, and
an increase in the difficulty effects an increase in the reward, and
the reward is issued after execution of the confirmation process.

13. A non-transitory, computer readable recording medium containing a program, which when executed by a computer causes the computer to perform actions, comprising:
by a capture condition data storage section, storing capture condition data that represents a condition for capturing a play image that indicates details of a game in progress; and
by a notification section, notifying capture of the play image appropriate to the condition represented by the capture condition data; wherein
difficulty data associated with the capture condition data represents difficulty involved in capturing the play image, and
reward data associated with the capture condition data represents a reward for capturing the play image, and
at least one of an increase in players of the game seeking the reward and an increase in time since an offering of the reward, effects an increase in the difficulty, and
an increase in the difficulty effects an increase in the reward, and
the reward is issued after notification of the capture.

14. An information processing system comprising:

a first information processing device and a second information processing device, wherein the first information processing device includes a capture condition data transmission section adapted to transmit, to the second information processing device, capture condition data representing a condition for capturing a play image that indicates details of a game in progress, the second information processing device includes a capture condition data storage section adapted to store the capture condition data, and a notification section adapted to notify the first information processing device of capture of the play image appropriate to the condition represented by the capture condition data, and the first information processing device further includes a confirmation process execution section adapted to execute a confirmation process for the capture of the play image appropriate to the condition represented by the capture condition data; wherein difficulty data associated with the capture condition data represents difficulty involved in capturing the play image, and reward data associated with the capture condition data represents a reward for capturing the play image, and at least one of an increase in players of the game seeking the reward and an increase in time since an offering of the reward, effects an increase in the difficulty, and an increase in the difficulty effects an increase in the reward, and the reward is issued after execution of the confirmation process.

* * * * *